(12) United States Patent
Blatt

(10) Patent No.: US 6,477,781 B1
(45) Date of Patent: Nov. 12, 2002

(54) ANGLE SPIRIT LEVEL DEVICE

(76) Inventor: Hans P Blatt, Dorfbornstrasse 13, Frankweiler, D 76833 (DE)

( * ) Notice: Subject to any disclaimer, the term of this patent is extended or adjusted under 35 U.S.C. 154(b) by 0 days.

(21) Appl. No.: 09/392,256

(22) Filed: Sep. 9, 1999

(30) Foreign Application Priority Data

Sep. 9, 1998 (DE) .......................................... 198 41 282

(51) Int. Cl.[7] .................................................. G01C 9/00
(52) U.S. Cl. ........................................... 33/384; 33/381
(58) Field of Search .......................... 33/384, 365, 368, 33/370, 371, 372, 373, 374, 375, 376, 381, 382, 383, 385, 386, 387, 388, 389, 451, 415, 481

(56) References Cited

U.S. PATENT DOCUMENTS

| 1,133,936 A | * | 3/1915 | Coughlin ..................... 33/384 |
| 2,471,327 A | * | 5/1949 | Hunt ........................... 33/384 |
| 2,993,281 A | * | 7/1961 | Dock ........................... 33/384 |
| 4,531,301 A | * | 7/1985 | Tau .............................. 33/382 |
| 4,774,767 A | * | 10/1988 | Scheyer ....................... 33/384 |
| 5,001,838 A | * | 3/1991 | Huxley et al. ................ 33/384 |

* cited by examiner

Primary Examiner—Christopher W. Fulton
(74) Attorney, Agent, or Firm—James Creighton Wray; Meera P. Narasimhan

(57) ABSTRACT

There is shown a spirit level device having a basic body element and a bubble element which pivots around an axis in its inclination towards the basic body element. An adjusting bubble element is fixed at the basic body element so that the middle part thereof is aligned parallel to the axis. The basic body element has an essentially L-formed profile whereby the adjusting bubble element is on one side which is angled at 90° in respect of the angle side, and the pivotable bubble element is on the other side of the angle of the basic body element.

7 Claims, 2 Drawing Sheets

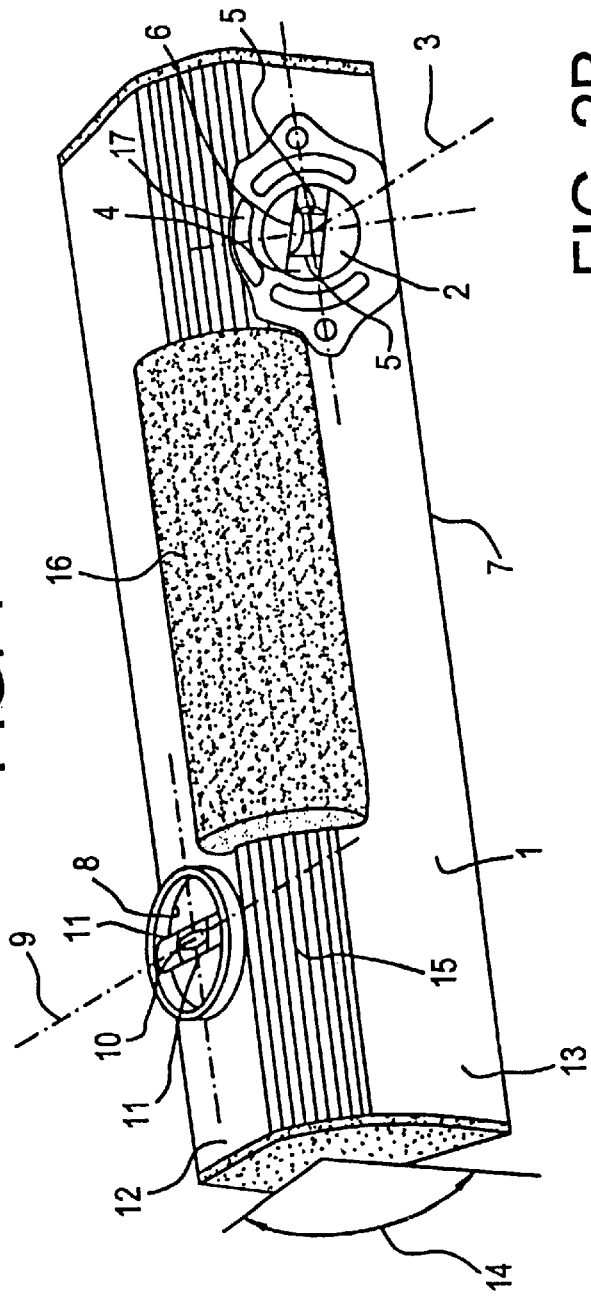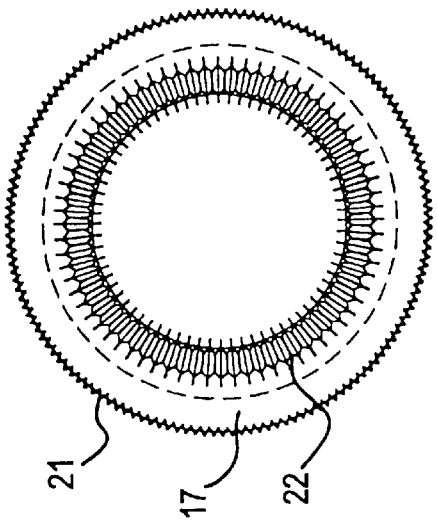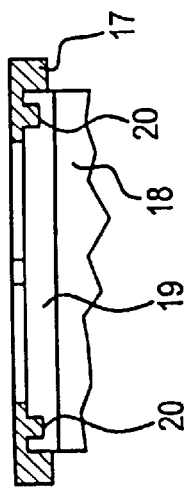

ANGLE SPIRIT LEVEL DEVICE

BACKGROUND OF THE INVENTION

This invention relates to an angle spirit level having a basic body element and a bubble element which are connected to each other whereby the bubble element can turn around an axis in its inclination relative to the basic-body-element.

Angle spirit levels are used according to the prior art in order to prove whether the surface or the side area of an object is straight, horizontal or vertical. In order to carry out this examination the basic body element of the spirit level is held on the surface or the side area of the object. The air bubble of the bubble element, which is partly filled with a liquid, indicates whether the wanted geometric arrangement is achieved.

One problem with the prior spirit levels arises when the directions to be examined are not exactly horizontal and not exactly vertical but have d certain inclination.

Bubble-elements have been used before which can be turned having regard to their inclination to the basic element of the spirit level. The measured angle is correct if after having put the spirit level on the object, the air bubble is within a particular area which shows that the air bubble is within a bubble element which is correctly turned a certain angle as indicated above. It has been observed that the prior art spirit level elements, namely with bubble elements which are turnable in respect to their inclination will sometimes give results which are not sufficiently correct. In order to obtain an exact measurement of an angle the body of the spirit level must be positioned exactly along a so-called line of steepest gradient (falling-line). If the body of the spirit level is outside of this line, the result is a corresponding error of the bubble element which can be turned relative to its inclination.

SUMMARY OF THE INVENTION

Therefore, it is an object of the invention to overcome the difficulties of the prior art.

The handling of the spirit level must be easy and positive.

This technical problem may be solved by this invention by creating an adjusting bubble element which is fastened on the main body of the spirit level whereby its middle position is parallel to an axis around the bubble element and can be turned in its inclination towards the main body of the spirit level.

This invention is based on the insight that by using such an adjusting bubble element it can be assured that the spirit level can be aligned exactly along the wanted line of steepest gradient with the consequence that errors within the adjustable bubble element are substantially reduced or obviated.

Further it is assured that a user of the spirit level will find the function and effectiveness of this device very easy to understand.

That means the handling of this new and inventive device is relatively easy in practice. The adjusting bubble-element is adjusted to be exactly perpendicular to the line of steepest gradient, i.e. a horizontal line. Thereby, the axis around which the bubble element is pivotably arranged in respect of the basic element is also aligned horizontally; namely perpendicular to the steepest gradient with the consequence that the plane surface in which the bubble element is pivotable is an exact vertical plane, in which the error, named above, cannot occur.

According to a preferred embodiment of this invention, the main body of the spirit, level has an essentially L-shaped cross-section whereby the adjusting bubble element is situated on one angle side, which is angled at 90 degrees (90°) to the other angle side which is carrying the pivotable bubble element. By this arrangement the adjusting bubble element can have a relatively large size with the consequence that it is easily readable.

According to this invention it is further proposed to put the bubble element which is pivotable relative to the basic element into a cylindrical box or case the central axis of which is identical to the axis around which the bubble element turns relative to its inclination. It is thus possible to get the position of the bubble element in the main body in a very simple way of installation.

Advantageously, the case can be provided with a scale ring on the spirit level with the consequence that an exact pre-adjustment is possible for the bubble element. This scale ring can also carry a scale concerning the percentage inclination as well as gradations.

Due to the fact that certain inclinations will occur very often it is possible to arrange a raster at the scale ring for these inclinations, for example in five degree steps.

This raster advantageously co-operates with raster elements which are arranged on a cover element.

Due to pollution an abrasion of the raster or the raster elements takes place over time but it is easy to change them with the described embodiment.

The cover element will advantageously have a lateral convexity into which the rim of the scale ring is installed and can be moved by way of an opening in the convexity, whereby a pre-adjustment of the bubble element is possible. Further, the cover element can be provided with a window in order to be able to read the markers on the scale ring.

Embodiments of the invention will now be described, by way of example, with reference to the following drawings, in which:

BRIEF DESCRIPTION OF THE DRAWINGS

FIG. 1 is a perspective view of a spirit level device according to one embodiment of the invention;

FIG. 2 comprising FIGS. 2(a) and 2(b), is a scale ring for the adjusting bubble element;

FIG. 3 comprising

DETAILED DESCRIPTION OF PREFERRED EMBODIMENTS

Figure 3A:
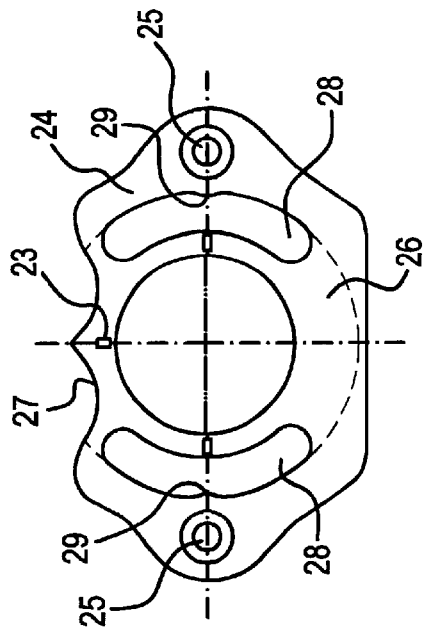
FIGS. 3(a) and 3(b), is a cover element by which the scale ring of FIG. 2 can be fixed on the spirit level of FIG. 1.

In FIG. 1, a spirit level according to an embodiment of this invention is shown and comprises an aluminium extruded body at the ends of which plastic caps are provided. Into this main body a bubble element 2 is provided and this is turned in its inclination around an axis 3 relative to the main body. In this bubble element a glass tube 4 is located and is filled partly with liquid and has two markers 5 circumscribing the tube. When the glass tube 4 is exactly horizontal the air bubble is between the two markers 5.

When the underside 7 of the main body 1 of the spirit level has that inclination to which the bubble element was previously adjusted, the air bubble 6 is between the markers 5. Thus it can be concluded hereby it must be taken that the underside 7 is located along the line of steepest gradient. If this condition is not achieved a measuring-and-indicating-mistake at the bubble element 2 would occur,—since this works correctly only when it is positioned vertically. In order to meet this condition, the spirit level has an adjustable bubble element 8 which is integral with the main body, whereby the middle position, the so called zero-axis of the bubble element, is parallel to the axis 3 around which the bubble element 2 turns or pivots. When the respective air bubble 10 is situated between the markers 11 of this bubble element 8 the zero axis 9 of the bubble is exactly horizontal. The axis 3 will then also be exactly horizontal which means the respective bubble element lies in a vertical plane so as to be level and accurately indicating the inclination.

The main body 1 which is shown in FIG. 1 has a profile essentially like a letter L with two angle sides 12,13 which have an angle 14 of 90° between them. The adjustable bubble element 8 is located on the angle side 12 whereas the pivotable bubble element 2 is located on the other angle side 13. Thus the adjusting bubble element 8 can be any desired size and can be easily read.

In the example shown here the main body 1 slopes at its outer edge where the two angle sides meet, on this slope 15 there is a handle 16 made out of plastic which facilitates handling of the spirit level.

The pivotable bubble element 2 is located in a cylindrical case, the middle-axis of which is identical with the pivoting or turning axis 3. On this case a scale ring is provided as shown in detail in FIG. 2. The case 18 has a clear end disc 19 below which the glass tube 4 can be seen. The end disc 19 has two holes into which the scale ring 17 engages by way of two cams 20—with the consequence that the scale ring 17 is fixed relative to the box 18. The scale ring 17 has a surrounding rim within which the outer side of the case 18 is located.

As it can be seen in FIG. 2b the scale ring 17 is grooved on its perimeter with the grooves 21, by means of which it can be turned. The case 18 is also pivoted by the cams 20.

In FIG. 2 it will be seen that on the upper side of the scale ring 17 a plurality of rasters 22 are provided which permit the scale ring to turn in five degree steps. In these rasters the raster elements 23 are gears which are arranged below a cover element 24 as shown in FIG. 3.

This cover element has two bore-holes 25 one at each end, by way of which it can be fastened to the spirit level. The scale ring 17 is situated in a recess on the under side of the cover element, whereby the raster elements 23 can mesh with the rasters 22 of the scale ring. By this means the case 18 with the pivotable bubble element 2 is fixed to the spirit level by the cover element 24 and the scale ring 17.

The cover element 24 has a lateral convexity 27, in which the scale ring 17 can be turned using the groove 21.

Figure 3B:
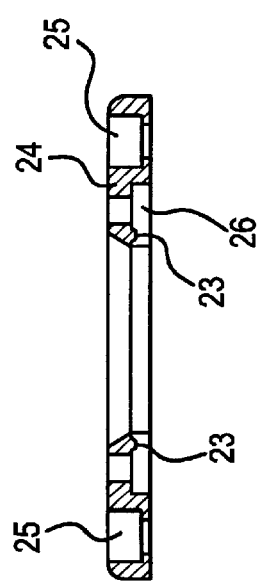

In FIG. 3 the cover element 24 is seen to have two windows 28 in which markers are provided which are carried by the scale ring 17. In the middle of the windows 28 are arrows 29 which act as indicators above the markers. The scale ring may be provided with a scale relating to inclination percentages as well as a scale relating to grades.

Figure 4:
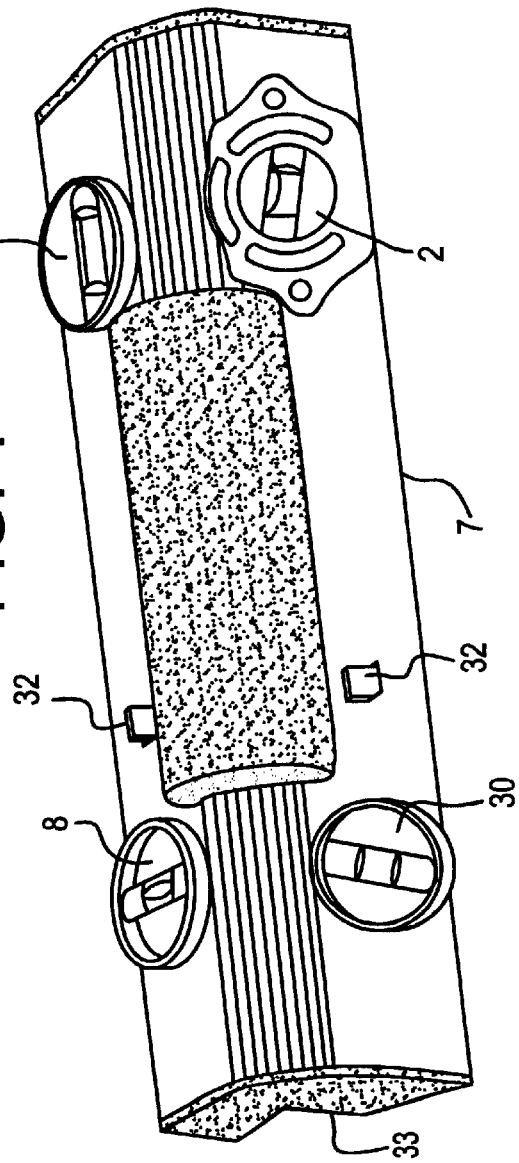
FIG. 4 is a perspective view of a spirit level according to another embodiment of this invention with further bubble elements.

In FIG. 4 another embodiment is shown and it will be seen that the spirit level has a rotatable bubble element 2 and an adjusting bubble element 8 as well as two additional bubble elements 30,31. When the rotatable bubble element 2 is located in its basic parallel, parallel to the side 7 of the spirit level, adjustments can he carried out very quickly on numerous levels.

In FIG. 4 two fixing screws 32 are shown by which flat magnets are fastened in the channel (groove) 33 with the consequence that the spirit level can be easily positioned on a pipe made out of iron and is held by the magnets.

It will be readily apparent to a person skilled in the art that a number of variations and modifications can be made without departing from the true spirit of the invention which will now be pointed out in the appended claims.

I claim:

1. A spirit level, comprising:

(a) an elongated main body having first and second sides at a 90° angle, (b) a pivotable bubble element in the first side integral with the main body and pivotable about a first axis to change an inclination of the first bubble element relative to a length of the main body, (c) an adjusting bubble element mounted in the second side integral with the main body, wherein a bubble in the adjusting bubble element moves along a second axis perpendicular to the first side and to the length of the main body and parallel with the first axis, wherein pivoting the pivotable bubble element about the first axis and selecting the angle of inclination relative to the length of the main body, aligning the first side of the main body to a vertical plane by centering a bubble in the adjusting bubble element, and maintaining the first side of the main body in the vertical plane while positioning the main body in the selected inclination by centering a bubble in the pivotable bubble element, thereby insuring that the selected inclination of the spirit level is achieved.

2. The spirit level of claim 1, further comprising a cylindrical box having a middle axis, wherein the pivotable bubble element is located in the cylindrical box and wherein the middle axis is identical to the first axis around which the pivotable bubble element pivots.

3. The spirit level of claim 2, wherein the box comprises a scale ring to facilitate adjustment.

4. The spirit level of claim 3, further comprising a cover element having plural raster elements, wherein the scale ring comprises a raster arrangement for cooperating with the plural raster elements of the cover element.

5. The spirit level of claim 4, wherein the cover element further comprises a lateral convexity for positioning an edge of the scale ring.

6. The spirit level of claim 5, wherein the scale ring further comprises markers and wherein the cover element comprises at least one window for reading the markers on the scale ring.

7. A method of using a spirit level, comprising providing (a) a main body with first and second 90° angled sides, (b) a pivotable bubble element mounted in the first side integral with the main body and pivotable about a first axis perpendicular to a plane of the first side to change an inclination of the pivotable bubble element relative to a length of the main body, (c) an adjusting bubble element mounted in the second side integral with the main body, wherein in a bubble in the adjusting bubble element moves along a second axis perpendicular to the length of the main body and parallel with the first axis, pivoting the pivotable bubble element about the first axis and selecting the angle of inclination relative to the length of the main body, aligning the first side of the main body to a vertical plane by centering a bubble in the adjusting bubble element, and maintaining the first side of the main body in the vertical plane while positioning the main body in the selected inclination by centering a bubble in the pivotable bubble element, thereby insuring that the selected inclination of the spirit level is achieved.

* * * * *